Feb. 25, 1969  F. A. KROHM  3,429,597
CLUTCH ASSEMBLY FOR WINDSHIELD WIPER ARM
Filed July 1, 1960  Sheet 1 of 3

INVENTOR.
FRED A. KROHM
BY W. E. Recktenwald
C. S. Penfold
ATTORNEY

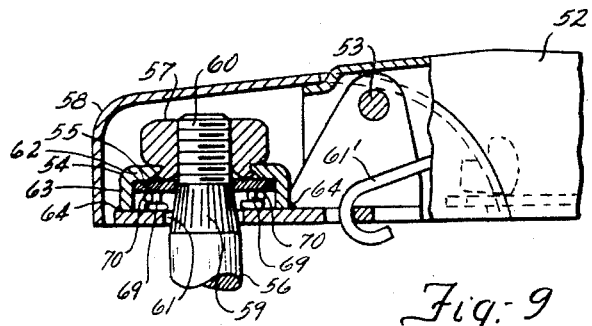
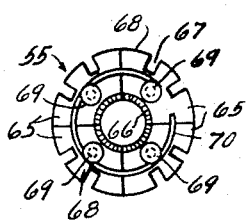
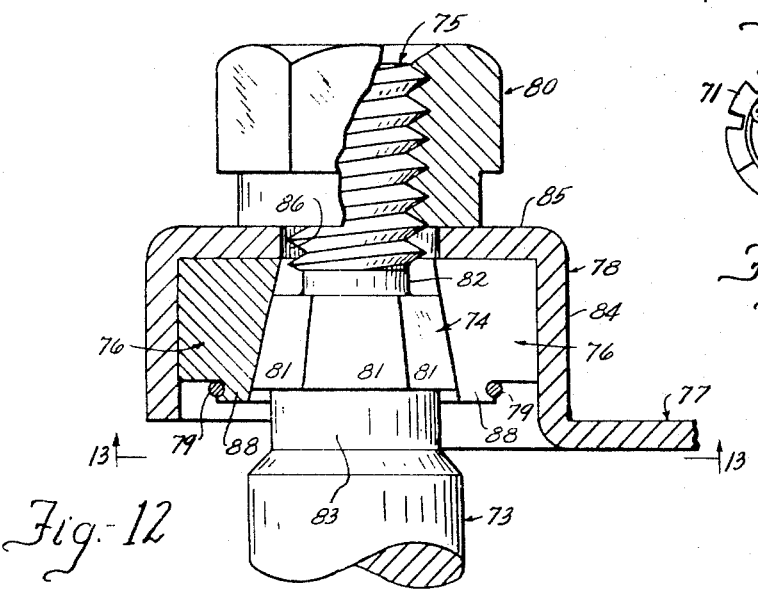
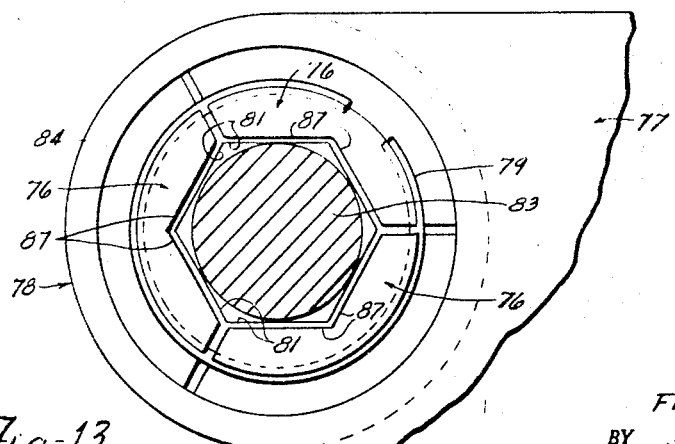

Feb. 25, 1969 F. A. KROHM 3,429,597
CLUTCH ASSEMBLY FOR WINDSHIELD WIPER ARM
Filed July 1, 1960 Sheet 3 of 3

INVENTOR.
FRED A. KROHM
BY W. E. Recktenwald
C. S. Penfold
ATTORNEY

United States Patent Office  3,429,597
Patented Feb. 25, 1969

3,429,597
CLUTCH ASSEMBLY FOR WINDSHIELD WIPER ARM
Fred A. Krohm, Hobart, Ind., assignor to The Anderson Company, a corporation of Indiana
Continuation-in-part of applications Ser. No. 411,470, Feb. 19, 1954, Ser. No. 507,578, May 11, 1955, and Ser. No. 540,469, Oct. 14, 1955. This application July 1, 1960, Ser. No. 40,276
U.S. Cl. 287—53    30 Claims
Int. Cl. B60s 1/34; F16d 1/06; A47l 1/02

This invention relates generally to means for detachably connecting a windshield wiper arm to a drive shaft and more particularly is directed to an improved clutch means which affords infinite rotary adjustment of the arm and its securement with respect to the shaft.

This application is a continuation-in-part of my application Ser. No. 411,470 filed Feb. 19, 1954, now abandoned, including my applications Ser. No. 507,578 filed May 11, 1955 and Ser. No. 540,469 filed Oct. 14, 1955.

Various means have been employed for detachably connecting a wiper arm to a drive shaft. In some constructions, the arm is snapped into connection with the shaft, while in others a latch is employed for readily connecting the arm to the shaft. One particular form of device now in use includes a shaft provided with a tapered serrated portion and an arm having a member which is adapted to cooperate with the serrated portion of the shaft for effecting adjustment of the arm in predetermined positions with respect to the shaft, including means for securing the member to the shaft after such ajustment. Another construction now in use includes a pair of superimposed serrated clutch members carried by a wiper arm, the arrangement being such that the clutch members can be adjusted and secured together in any one of a number of predetermined positions with respect to one another and the shaft.

Constructions of the above character have not proven satisfactory in all respects. One objection is due to the fact that the arm can be adjusted and secured only in any one of a number of predetermined positions and as a result it is ofttimes difficult to secure a pair of arms in proper angular or matching relationship with respect to one another and/or the windshield wiper frame.

When an arm is not secured or set in its proper position on a shaft the swinging arc of the arm is such that the blade will usually slap or bang against the frame of the windshield as the blade moves back and forth in an arc on the windshield. This slapping of the blade against the frame has a disturbing influence on the driver and other occupants of the car. When the arm is not secured in the proper position the blade will not swing through its prescribed arc and as a result full vision through the windshield is prevented due to a reduction in the area wiped.

With the foregoing in mind, the important object of the invention is to overcome the disadvantages inherent in the prior devices above alluded to and provide improved clutch means which may be utilized to afford infinite rotary adjustment of the arm with respect to a shaft.

A particular object of the invention is to provide an assembly which includes the inner section of a wiper arm, a cup carried by the section, a clutch member preferably in the from of a disc disposed in the cup for simultaneous cooperation with the serrated portion of a shaft and the inner annular wall of the cup, and pressure-applying means preferably in the form of a nut for securing the inner arm section to the shaft with the clutch member forcibly engaging the shaft and said annular wall. The inner arm section and the base wall of the cup are each preferably provided with an opening or aperture through which the shaft extends. The clutch member is preferably made concavo-convex in form and provided with a central aperture, the marginal edge of which is preferably serrated to cooperate with the tapered serrated portion of the shaft. The clutch member is also preferably split and further provided with radially extending portions, the circumferential margins of which are adapted to cooperate with the inner annular surface defined by the cylindrical side wall of the cup. The setup is such that when the nut is loosened the arm may be freely adjusted to any rotative position desired with respect to the longitudinal axis of the shaft and then firmly secured in position by merely tightening the nut. More specifically in this regard, when axial pressure is exerted on the disc means through the nut, the means will be caused to grip the shaft and expand or flex radially so that the periphery of the disc will forcibly engage or bite into the wall of the cup.

A significant object of the invention is to provide a structure in which the clutch means may be comprised of one or more resiliently flexible or one or more rigid members or segments.

A specific object of the invention is to provide a clutch means comprising a plurality of segments or elements and resilient means for operatively connecting the segments.

Also, an object of the invention is to provide a clutch means which may be designed and constructed for engaging a shaft provided with a tapered serrated portion or a portion provided with a plurality of facets or seats which are disposed generally in a converging relationship toward an end of the shaft.

Another object of the invention is to provide a clutch assembly which offers advantages with respect to manufacture, cost, and assembly.

A further object of the invention is to provide an arm assembly which includes the inner section above referred to, an outer section pivotally connected to the inner section, and a cap pivotally connected to the outer section for covering the inner section including the cup, nut, and the upper end of the drive shaft.

Another object of the invention is to provide an assembly in which the nut is operatively connected thereto to constitute a component thereof.

Other objects and advantages of the invention will become apparent after the description hereinafter set forth is considered in conjunction with the drawings annexed hereto.

Referring to the drawings:

FIGURE 9 is an enlarged partial vertical section of the wiper arm showing the manner in which rigid segments of the clutch means cooperate with the shaft;

FIGURE 10 is a view of the clutch means comprised of four segments or elements, with resilient means operatively connecting the segments;

FIGURE 11 is a view similar to FIGURE 10 showing a clutch means comprised of three segments;

FIGURE 12 is a vertical section taken through a modified form of an assembly showing its connection with a shaft;

FIGURE 13 is a transverse section taken substantially on line 13—13 of FIGURE 12;

Figure 4:
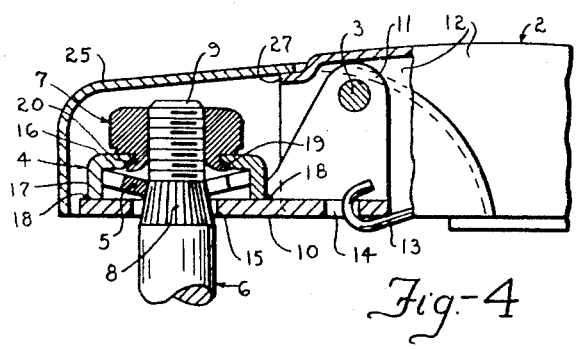
FIGURE 4 is an enlarged partial section of the windshield wiper arm showing the manner in which the clutch means functions.

Referring first to the structure exemplified in FIGURES 1 through 4 of the drawing, numeral 1 generally designates an inner section of a windshield wiper arm, 2 an outer section of the arm connected for movement with respect to the inner section by means of a cross pivot 3, a cup, cage housing or socket formation 4 carried by the inner section, a clutch or yieldable means 5 for connection with the formation and a drive shaft 6, pressure-applying means preferably in the form of a nut 7 for influencing the operation of the clutch means 5 to secure the wiper arm in any desired rotary position with respect to the longitudinal axis of the shaft. The drive shaft includes a tapered serrated portion 8 and a threaded portion 9 as shown in FIGURE 4.

The inner section of the wiper arm includes a substantially planar base portion or support 10 and a pair of corresponding parallel uprights 11. The outer section of the wiper arm may be constructed as desired, but is preferably made in the form of a tapered channel, the side walls 12 of which straddle the uprights of the inner section. The pivot 3 extends through holes provided therefor in the uprights and the side walls of the outer section for pivotally connecting the arm sections together. The free end of the outer arm section is provided with means (not shown) for supporting a wiper blade. A spring-actuating assembly is housed in the outer arm section for urging the outer section toward a windshield. This assembly includes a spring 13, one end of which is hooked in an aperture 14 provided in the base wall of the inner section as clearly shown in FIGURE 4.

The bottom wall of the inner section is also provided with a clearance opening 15 for the drive shaft. The cup or formation 4 is preferably round and includes a base or end wall 16 and a cylindrical side wall 17. The cup is preferably permanently joined or secured in an inverted position on the upper surface of the bottom wall of the inner section by welding the annular marginal edge portion of the cup to the inner section as indicated at 18 in FIGURES 3 and 4 to provide housing means within which the clutch is confined for rotation. That portion of the bottom wall of the inner section in which the opening is provided constitutes abutment means disposed in an axial spaced relation to the base wall 16 of the cup. Obviously the cup can be attached to the inner section by clamping it thereto and if found desirable can be formed out of the inner section.

The base wall of the cup is provided with an opening 19 and the nut 7 is preferably trapped for rotary movement on the cup. The nut is preferably connected to the cup by providing the nut with a generally tubular portion 20 which is inserted into the opening 19 and is then flanged outwardly to interlock the nut and cup as depicted in FIGURE 4. It will be noted that the marginal edge defining the opening 19 is tapered so as to facilitate distortion of the tubular portion 20 of the nut.

Figure 2:
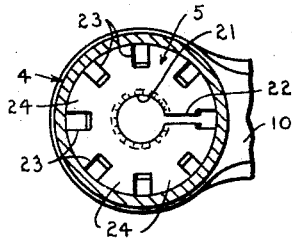
FIGURE 2 is a transverse section taken through the clutch assembly.
Figure 3:
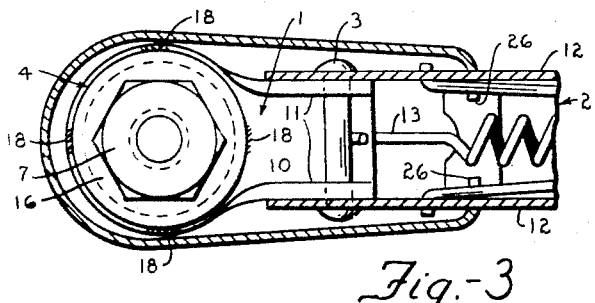
FIGURE 3 is a top view of the wiper arm with portions in section to exemplify the operative relationship of the clutch assembly with the inner section of the arm.

The clutch means 5 may be constructed in various ways, but as herein shown is preferably made in the form of a substantially concavo-convex disc which is confined for rotary movement in the cup between its base wall and that portion of the base wall of the inner section constituting the abutment means. The disc is round and provided with a central aperture 21, the marginal edge of same being serrated for cooperation with the tapered serrated portion 8 of the shaft as shown in FIGURE 4. This disc is preferably split by providing a radial slot 22 therein which intersects the central aperture 21 and the periphery of the disc as shown in FIGURE 2. The periphery of the disc is preferably provided with a plurality of interruptions or radially extending notches 23 which serve to form a plurality of radially extending fingers or projections 24, the outer circumferential portions of which are adapted to intimately engage or bite into the inner cylindrical surface of the side wall 17 of the cup when the disc is compressed by tightening the nut on the shaft. It will be noted that the radially extending fingers or projections are tapered in order to promote flexibility of the disc.

Attention is directed to the fact that the serrations on the disc substantially correspond to the serrations provided on the shaft. In other words, the serrations on the disc and the serrations on the shaft substantially correspond in number and cross-sectional configuration so that they will cooperate with one another to permit selective adjustment of the disc on the shaft in any one of a number of predetermined positions.

To connect the arm to the shaft is a simple matter because it is only necessary to extend the upper end of the shaft through the inner arm section and clutch means and then secrure the nut to the threaded portion 9 of the shaft. The arm is then located in its proper rotative position with respect to the longitudinal axis of the shaft, whereupon the nut is tightened sufficiently on the shaft to compress the disc and thereby cause the serrations thereon to grip the tapered serrated portion of the shaft and also cause the circumferential or peripheral portions of the fingers 24 to forcibly engage the inner surface of the cylindrical side wall 17 of the cup to firmly secure the arm in place. Attention is directed to the important fact that the disc is constructed and arranged so that its fingers will engage the side wall of the cup at a location close to the base wall of the cup and thereby alleviate any tendency of the side wall to spread when the disc is under tension.

Figure 1:
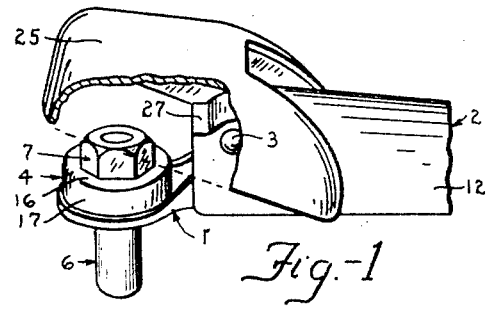
FIGURE 1 is a view showing a wiper arm attached to a drive shaft with a cap or cover located in a raised position.

As pointed out in the beginning of the specification, an important object of the invention is to provide a cap or shroud for concealing the clutch assembly. This is preferably accomplished by providing a cap or cover 25 having, among other things, a notch therein for receiving the outer arm section so that the side walls of the cap will straddle this section. The side walls of the cap are preferably provided with inturned projections 26 which extend into apertures provided therefor in the side walls 12 of the outer channel section 2 of the arm to provide a pivotal connection between this section and the cap. As illustrated in FIGURE 1, the cap is shown in an elevated position to permit connection of the inner section of the arm to the shaft 6. After the connection has been established, the cap is lowered to the position depicted in FIGURE 4. It will be noted that the outer wall of the outer arm section is provided with an offset abutment 27 which provides a rest for the bottom wall of the cap as exemplified in FIGURES 1 and 4.

Figure 5:
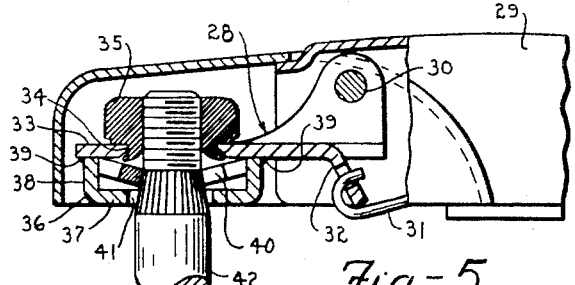
FIGURE 5 is a view similar to FIGURE 4 showing a modified form of clutch assembly.
Figure 8:
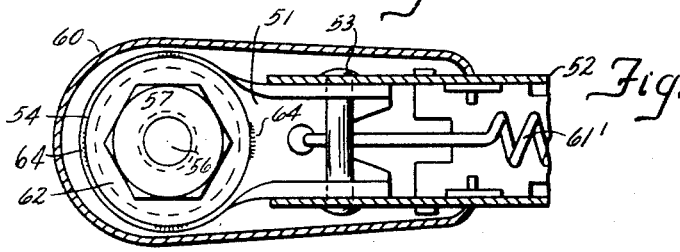
FIGURE 8 is a top view of a wiper arm, with portions in section to further exemplify the operative relationship of the clutch assembly with the arm and shaft.
Figure 17:
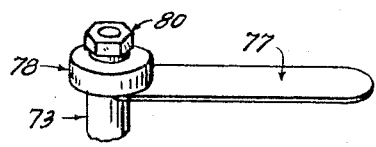
FIGURE 17 is a pictorial view showing the arm attached to the shaft by the assembly.
Figure 14:
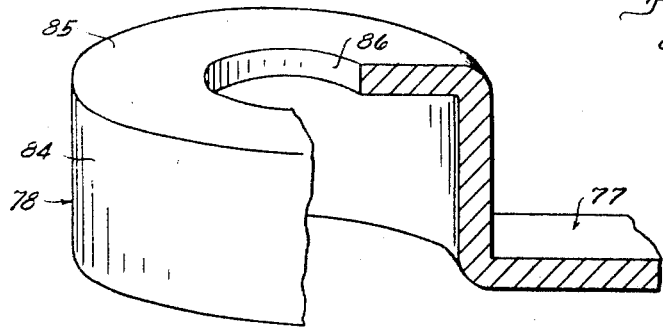
FIGURE 14 is a partial perspective view of a cup constituting a part or portion of an operating member such as an arm.
Figures 15, 16:
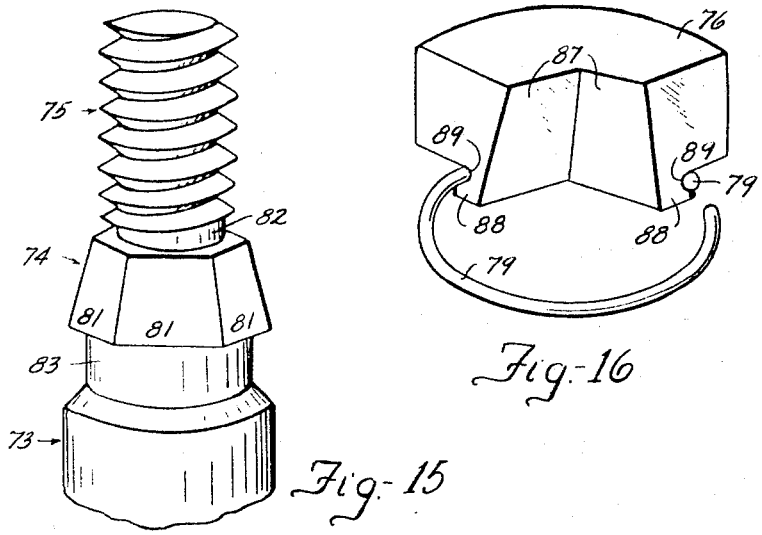
FIGURE 15 is a pictorial view of the upper extremity of the shaft showing same provided with facets.
FIGURE 16 is a pictorial view of one of the segments of the clutch means and a spring assembled with the segment for holding the segments assembled.

The modified arm structure illustrated in FIGURE 5 includes an inner section 28 and an outer channel section 29 which are connected together by a pivot 30. The outer section is provided with an assembly having a spring 31 connected to an offset 32 extending angularly from a base or end wall 33 of the inner section for urging the outer arm section toward a windshield in substantially the same manner that the outer arm section 2 above referred to is urged toward a windshield. The base wall 33 of the inner section 28 is provided with an opening 34 within which a nut 35 is secured in substantially the same manner that the nut 7 above referred to is secured in the opening 19 provided in the base wall 16 of the cup 4.

A cup 36 similar to cup 4 includes a bottom wall 37 and a cylindrical wall 38, the marginal edge portion of the latter being preferably joined to the underside of the base wall 33 by welds 39 to secure within the cup a clutch means 40 corresponding to the clutch means 5 above referred to. The bottom wall of the cup 36 is provided with a clearance opening 41 for a shaft 42. The operation of the structure in FIGURE 5 is substantially the same as the first-described structure. It will thus be apparent that the structure illustrated in FIGURE 5 is primarily distinguishable from the structure illustrated in FIGURES 1 through 4 by mounting a cup on the underside of the inner arm section and rotatably securing the nut on the inner arm section in lieu of attaching the nut to the cup.

Figure 6:
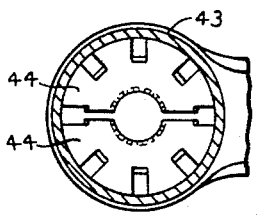
FIGURE 6 is a transverse section similar to FIGURE 2 exemplifying a different form of one of the clutch means of the clutch assembly.

The modified construction exemplified in FIGURE 6 of the drawing, except for one change, substantially corresponds to the structures above described. More particularly this modification includes a cup means 43 and a clutch means comprised of at least two separate corresponding parts 44. Two or more separate parts can readily accommodate themselves with respect to the inner cylindrical surface of the cup means and the serrated portion of the shaft to provide a more stable and positive connection or connections between the clutch assembly and the shaft. Furthermore, less force will be required to manipulate the nut to obtain the desired clamping action.

The modified structure exemplified in FIGURES 7 through 11 of the drawing is similar to that illustrated in FIGURES 1 through 6, and numeral 51 generally designates an inner section of a windshield wiper arm, 52 an outer section of the arm connected for movement with respect to the inner section by means of a cross pivot 53, 54 a cup or formation carried by the inner section, 55 a clutch means for engagement with the cup and a drive shaft 56, 57 a pressure-applying means preferably in the form of a nut for operating the clutch means 55 to secure the wiper arm in any desired rotary position with respect to the longitudinal axis of the shaft, and 58 a cap attached to the outer section. The drive shaft includes a tapered serrated portion 59 and a threaded portion 60 as shown in FIGURE 9.

The outer arm section 52, nut 57, cap 58 and a spring 61' of the above structure are substantially the same as those exemplified in FIGURES 1, 3, 4 and 5 above referred to and, therefore, will not be described in detail.

The bottom wall of the inner section is planar and provided with a clearance opening 61 for the drive shaft. The cup or formation 54 is preferably annular and includes a base wall 62 and a cylindrical or annular side wall 63. The cup is preferably permanently joined or secured in an inverted position on the upper surface of the bottom wall of the inner section by welding the annular marginal edge portion of the cup to the inner section as indicated at 64 in FIGURES 8 and 9 to provide a housing means for the clutch means 55. Obviously, the cup can be attached to the inner section by clamping it thereto and if found desirable can be formed out of the inner section.

Figure 7:
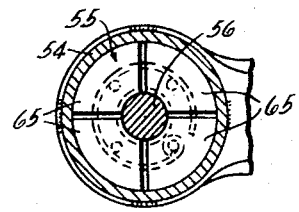
FIGURE 7 is a transverse sectional view similar to FIGURES 2 and 6 of a modified form of clutch assembly connected to a shaft.

The clutch means 55 may be constructed in various ways but as herein shown is preferably made in the form of a disc assembly arranged within the confines of the cup 54. More specifically, the clutch means is comprised of four identical segments or elements 65, the inner arcuate edges of which are serrated as indicated at 66 and cooperate with the tapered serrated portion 59 of the shaft as shown in FIGURES 7 and 9. The outer portions of the disc segments are preferably constructed with a plurality of interruptions 67 which serve to provide a plurality of radially extending fingers or projections 68, the outer circumferential or arcuate edges of which are adapted to intimately engage or bite into the inner annular surface of the side wall 63 of the cup when the segments of the disc are moved radially by tightening the nut on the shaft.

Attention is directed to the fact that the serrations on the segments substantially correspond to the serrations provided on the shaft. In other words, the serrations on the disc segments and the serrations on the shaft substantially correspond in number and cross-sectional configuration so that they will cooperate with one another to permit selective adjustment of the clutch means on the shaft in any one of a number of predetermined postions.

To connect the arm to the shaft is a simple matter because it is only necessary to extend the upper end of the shaft through the opening 61 in the inner arm section and the clutch means and then secure the nut to the threaded portion 60 of the shaft. When the arm is located in its proper rotative position with respect to the longitudinal axis of the shaft the nut is tightened sufficiently on the shaft to move the disc segments radially and thereby cause the serrations on the segments to grip the tapered serrated portion of the shaft and also cause the arcuate or peripheral portions of the fingers 68 to forcibly engage the inner surface of the cylindrical side wall 63 of the cup to firmly secure the arm in place. Attention is directed to the important fact that the clutch means is constructed and arranged so that its fingers will engage the side wall of the cup at a location close to the base wall of the cup and thereby alleviate any tendency of the side wall to spread when the clutch means is under pressure.

As clearly illustrated in FIGURES 9 and 10 a headed pin or abutment 69 is preferably secured to the underside of each of the disc segments 65. A spring 70, preferably arcuate in shape, is arranged in substantially encircling engagement with the shanks of the pins in order to hold the segments together and thereby facilitate handling and placement of the clutch means in the cup. It will be noted that the spring is preferably of a gauge slightly less than the length of the exposed portions of the pin shanks so that the segments will be maintained in the predetermined engaging or abutting relationship shown in FIGURE 10 until they are placed in operative position on the shaft as depicted in FIGURE 7. Although not essential, it will also be noted that the lengths of the pins are preferably such that their heads may engage the planar base of the inner section to locate the disc segments so that they will all engage the shaft and cup in a corresponding way to obtain a well-balanced and positive connection between the shaft and wiper arm.

The modified clutch means illustrated in FIGURE 11 of the drawing, may be comprised of three corresponding segments 71, each of which is made similar to the segments 65 above referred to. The segments are similarly held assembled by a spring 72 connected to pins carried by the segments.

The modified structure exemplified in FIGURES 12 through 17 of the drawing includes a shaft 73 provided with a tapered portion generally designated 74 and a threaded end 75, a clutch means comprising a plurality of corresponding segments 76 engaging the tapered portion, an operating member 77 having an annular cup or socket 78 surrounding the segments, a spring 79 connecting the segments, and a nut 80 carried by the threaded end of the shaft for controlling the action of the segments.

The tapered portion of the shaft is preferably formed to provide in cross section a hexagon tapering toward the threaded end of the shaft. More specifically, the tapered portion includes six corresponding planar facets or seats 81 which extend in a converging direction toward the shaft end and each facet is preferably in the form of an isoceles trapezoid. The tapered portion 74 and threaded end 75 are preferably joined by a reduced or neck portion 82 and the tapered portion is joined with an inner larger portion of the shaft by a neck portion 83 for clearance purposes. Obviously, the tapered portion may be provided with any number of facets or seats desired, the number of facets corresponding to the number of corners provided by the configuration. In fact, the tapered portion may be referred to as a polygonal or truncated pyramidal formation.

The operating member 77 may be in the form of a lever, as illustrated, for rotating the shaft or a member, such as a wiper arm, attached to the shaft for actuating some mechanism, such as a wiper blade, by rotating the shaft. The cup or housing means 78 has a cylindrical side wall 84 and an end or base wall 85 provided with a center aperture 86 through which extends the threaded end of the shaft. The wall thickness of the cup is made sufficient to withstand axial and radial thrusts resulting from the tightening of the nut and the inner bearing surface of the side wall is made smooth and true.

The segments 76 are rigid or inflexible and held together by the spring 79 and constitute a separate subassembly or unit which is preferably applied to the shaft in advance of the operating member. The segments are substantially identical and when assembled form a tapered socket or formation which receives the tapered portion of the shaft as exemplified in FIGURES 12 and 13. Each segment is generally arcuate in shape and has a circumferential length approximating one hundred twenty (120°) degrees. The outer peripheral surface of each segment is made smooth for intimate contact or engagement with the side wall of the cup. The inner portion of each segment is preferably provided with a V-shaped recess, seat or pocket defined by a pair of corresponding obtusely angled planar surfaces 87. These surfaces are inclined so that recess will be tapered to more or less conform and receive one of the corners of the tapered portion of the shaft. The surfaces 87 are made smooth to afford a good sliding action on the facets 81 which are also made smooth so as to provide an efficient grip on the tapered portion and afford a setup whereby the clutch means tends to be urged toward the end of the shaft by the spring when the nut is loosened sufficiently to permit such movement.

The inclination of the facets and V-shaped recesses serve to facilitate application of the clutch means or assembly to the shaft and also increases the area of contact between the assembly and shaft to provide a positive non-rotative connection.

It will be noted that the axial length of the clutch means or segments is somewhat greater than the axial length of the tapered portion of the shaft in order that substantially the complete areas of the facets will be in contact with the segments and at the same time afford for axial adjustment of the segments with respect to the tapered portion of the shaft. It will also be noted that the axial lengh of the cylindrical side wall of the cup is somewhat greater than the axial length of the clutch means so that the latter is disposed for axial adjustment entirely within the confines of the cup.

The inner part of each segment is preferably provided with an axially extending portion 88 having an exterior groove 89 therein. Otherwise expressed, each segment is provided with an axially extending portion having a lateral offset disposed in spaced relation to the under or inner side of the segment to form a recess or groove. The grooves 89 in combination form a generally annular seat for the split ring spring 79. As pointed out above, this spring is preferably located adjacent the base of the clutch means in order to assist in urging the means toward the end of the shaft when the nut is sufficiently loosened to permit such movement. This feature serves to automatically loosen the segments on the shaft and withdraw the segments from the side wall of the cup to permit rotary adjustment of the operating member with respect to the clutch means and shaft when the nut is loosened.

Attention is directed to the fact that the relationship of the components or parts is such that the segments will automatically adjust themselves to the tapered portion of the shaft and the side and base walls of the cup when the nut is tightened. When the parts are assembled as shown in FIGURES 12 and 13, and the nut is tightened, the nut will bear against the base wall of the cup and cause the outer ends of the segments to engage the base wall and force the segments axially into engagement with the tapered portion of the shaft and radially outwardly into engagement with the side wall of the cup to positively lock the segments to the shaft and the cup to the segments. In other words, due to the tapered character of the shaft and the recesses in the segments, the segments are cammed outwardly into intimate contact with the side wall of the cup when moved axially into a locked position by the nut. This compound thrust imparted to the segments has proven efficient and positive in action. By merely loosening the nut a sufficient extent, the operating member may be adjusted to any rotative position desired and then locked in such position by tightening the nut.

Although a nut is employed in all of the above constructions, it is, of course, understood that any pressure-applying means in lieu thereof may be utilized. For example, a lever could be pivoted to the free end of the shaft, with a cam on the lever for engaging the base of the cup.

Having thus described my invention, it is obvious that various modifications may be made in the same without departing from the spirit of the invention; and, therefore, I do not wish to be understood as limiting myself to the exact forms, constructions, arrangements and combinations of parts herein shown and described.

I claim:

1. An assembly comprising a drive shaft provided with a tapered serrated portion and a threaded portion, a windshield wiper arm provided with an inner section having a base wall provided with an aperture through which the shaft extends, said inner section also being provided with a cup portion having a side wall and a bottom wall, said bottom wall being disposed in axial spaced relationship to said base wall and having an aperture therein aligned with the base wall aperture with the shaft extending therethrough, yieldable concavo-convex split disc-like means disposed and held in said cup portion between said base wall and said bottom wall, said means having an opening therein aligned with said apertures and receiving the serrated portion of the shaft and with its periphery arranged in a predetermined relationship to the inner surface of the side wall of the cup portion, the marginal edge defining said opening in the disc-like means being serrated to engage the serrations on the shaft, and a nut connected to the threaded portion of the shaft and supported against the base wall, said nut when screwed tightly onto the shaft serving to cause the disc-like means to forcibly engage the serrated portion of the shaft and the inner surface of the side wall of the cup portion for securing the said inner section of the arm in a fixed position on the shaft.

2. Windshield wiper arm structure adapted for attachment to a shaft having a tapered serrated portion and a threaded portion, said structure comprising an inner section having a base wall provided with an aperture, a cup secured to the section and having a cylindrical wall and a bottom wall with the latter wall spaced from said base wall and provided with an aperture, yieldable concavo-convex split disc means disposed between said base wall and bottom wall and being normally freely rotatable in the cup, said disc means being provided with an opening aligned with said apertures, and a nut carried by the base wall and constituting a component of the structure for engaging the threaded portion of the shaft, the arrangement being such that when the structure is applied to a shaft with the latter extending through said apertures and opening and the nut is tightened on the threaded portion of the shaft, the disc means grips the serrated portion of the shaft and also forcibly engage the inner surface of the cylindrical wall of the cup in a manner to firmly secure the structure against rotation on the shaft.

3. An assembly comprising a drive shaft having a portion provided with tapered surfaces and a connecting portion adjacent said tapered surfaces, an arm provided with socket means having a base wall provided with an aperture through which the connecting portion of the shaft extends, said socket means also having a side wall, abutment means carried by the arm and receiving the shaft, said abutment means also being axially spaced from the base wall of the socket means, a plurality of segments movably arranged in the socket means and held therein by said abutment means, said segments having inner surfaces for selectively engaging the tapered surfaces on the shaft and outer surfaces for selectively engaging the side wall of the socket means, and means engaging the socket means and connected to the connecting portion of the shaft for applying pressure to cause the inner and outer surfaces of the segments to respectively forcibly engage the tapered surfaces of the shaft and the side wall of the socket means in a manner whereby the arm can be locked to the shaft for movement therewith.

4. An assembly comprising a drive shaft having a tapered portion and a connecting portion adjacent said tapered portion, a windshield wiper arm provided with housing means having an end wall with an aperture therein and also having side wall structure, abutment means carried by the arm and axially spaced from the end wall of the housing means, a plurality of elements movably arranged in the housing means and held therein by said abutment means, each of said elements having an inner surface for engaging the tapered portion on the shaft and also having an outer surface for engaging the side wall structure of the housing means, and means trapped in the aperture provided in the end wall and engaging the connecting portion of the shaft for applying pressure to cause the inner and outer surfaces of the elements to respectively forcibly engage the tapered portion of the shaft and the side wall structure of the housing means in a manner whereby the arm can be locked to the shaft for movement therewith.

5. An assembly comprising a drive shaft having a portion provided with tapered surfaces and a threaded portion adjacent the tapered surfaces, a windshield wiper arm provided with an inner section having housing means, said housing means having an end wall provided with an aperture into which the threaded portion of the shaft extends and also having side wall structure, abutment means disposed adjacent the side wall structure and spaced from the shaft and the end wall of the housing means, a plurality of elements movably arranged in the housing means and held therein by said abutment means, each of said elements having an inner surface for engaging a tapered surface on the shaft and an outer surface for engaging the side wall structure of the housing means, and a nut engaging the housing means and connected to the threaded portion of the shaft for applying pressure to cause the inner and outer surfaces of the elements to respectively forcibly engage tapered surfaces of the shaft and the side wall structure of the housing means in a manner whereby the wiper arm can be locked to the shaft for movement therewith.

6. Windshield wiper arm structure adapted for attachment to a shaft having a tapered portion and a threaded portion, said structure comprising an inner section having a bottom wall provided with an aperture, inverted cup-like means rigidly connected to said bottom wall and having a side wall and an end wall, said end wall being spaced from said bottom wall and being provided with an aperture, a plurality of clutch elements disposed between said bottom wall and said end wall and being movable in said cup-like means, each of said clutch elements having an inner surface for engaging the tapered portion of the shaft and an outer surface for engaging said side wall of the cup-like means, and a nut carried by the cup-like means for connection with the threaded portion of the shaft.

7. A windshield wiper arm structure adapted for attachment to a shaft having a tapered portion and a threaded portion comprising an inner section having a base wall provided with an aperture, a cup-like member rigidly connected to said base wall, said cup-like member having an annular side wall and a bottom wall, said bottom wall being spaced from said base wall and being provided with an aperture in substantial alignment with the aperture in said base wall, a plurality of clutch elements disposed within said cup-like member between said base wall and said bottom wall, each of said clutch elements having an inner surface for engagement with said tapered portion of the shaft and an outer surface for engagement with said side wall of the cup-like member, and a nut engaging the base wall for connection with the threaded portion of the shaft.

8. A windshield wiper arm comprising an outer section for supporting a wiper blade and an inner section pivotally connected to the outer section for attachment to a shaft having a tapered portion and a threaded portion, said inner section including a housing having an end wall and annular side wall structure with means extending radially inward toward the longitudinal axis of the housing and in axially spaced relationship to the end wall, a plurality of clutch elements confined for relative movement in the housing, each of said elements having an inner surface for engaging the tapered portion of the shaft and an outer surface for engaging the side wall structure, said end wall being provided with an aperture affording access to the threaded portion of the shaft, and a nut engaging with said housing and disposed for connection with the threaded portion of the shaft when the latter is extended into the housing for causing the inner and outer surfaces of the elements to respectively forcibly engage said tapered portion and said side wall structure for locking the arm to the shaft.

9. Windshield wiper arm structure adapted for attachment to a shaft having a tapered serrated portion and a threaded portion, said structure including an inner section having a cup fixed thereon, said cup having a side wall and a bottom wall, disc-like means disposed in the cup between its bottom wall and the inner section, said disc-like means consisting of a plurality of individual segments for cooperation with the side wall of the cup and the serrated portion of the shaft, said bottom wall of the cup being provided with an aperture and said inner section with an opening through which the shaft can be extended, and a nut connected to the inner section for rotation in the opening thereof for engaging the threaded portion of the shaft, the arrangement being such that when the structure is applied to a shaft and the nut is tightened sufficiently on the threaded portion of the shaft, the segments will be caused to engage the serrated portion of the shaft and forcibly engage the inner surface of the side wall of the cup to firmly secure the structure to the shaft.

10. A windshield wiper arm comprising an inner section and an outer section pivotally connected to the inner section, said inner section including a planar portion provided with a cup formation having a base wall and a side wall, a plurality of radially movable arcuate clutch segments arranged in the formation and having inner surfaces for gripping a tapered portion of a shaft and outer surfaces for engaging the side wall of the formation, said planar portion and said base wall being provided with apertures so that the shaft can be extended therethrough and between the segments, and pressure-applying means connected with the shaft and engageable with the base wall of the formation for applying pressure to cause the segments to grip the tapered portion of the shaft and forcibly engage the side wall of the formation to lock the arm for movement with the shaft.

11. In combination: a drive shaft provided with a tapered serrated portion and a threaded portion, a windshield wiper arm provided with an inner section having an aperture therein through which the shaft extends, said inner section including a cup portion formed integrally therewith and having a side wall and an end wall having an aperture therein through which the shaft extends, a plurality of inflexible radially movable segments circumferentially arranged in said cup portion, said segments having inner serrated portions for engaging the serrated portion of the shaft and outer portions for engaging the side wall of the cup portion, and a nut engaging the cup portion and threaded on the threaded portion of the shaft, said nut when screwed tightly onto the shaft serving to cause the segments to forcibly engage the tapered serrated portion of the shaft and so the latter will force the segments radially outward to cause their outer portions to forcibly engage the inner surface of the side wall of the cup portion for securing the said inner section of the arm in a fixed position on the shaft.

12. Structure of the kind described adapted for attachment to a shaft having a tapered portion and a threaded portion, said structure comprising an inner section of a wiper arm, an aperture provided in the inner section, a cup formed integrally with the inner section and having a cylindrical wall and a bottom wall, an aperture provided in the bottom wall, circumferentially arranged inflexible gripping members normally freely rotatable in the cup for action against the tapered portion of the shaft and the cylindrical wall of the cup, and a nut engaging the inner section and constituting a component of the structure disposed axially with relation to the bottom wall, gripping members and apertures, the arrangement being such that when the structure is applied to a shaft with the latter extending through all of the said apertures and between the gripping members and the nut is tightened on the threaded portion of the shaft, the gripping members grip the tapered portion of the shaft and also move radially outward to forcibly engage the inner surface of the cylindrical wall of the cup in a manner to firmly secure the structure against rotation on the shaft.

13. In combination: a drive shaft having a portion provided with tapered surfaces and a connecting portion adjacent said tapered surfaces, an arm provided with socket means having a base wall provided with an aperture to afford access to the connecting portion of the shaft and also having a side wall, said socket means also having a wall spaced axially from the base wall and provided with an aperture receiving the shaft, a plurality of rigid segments movably arranged in the socket means and held therein by said walls, said segments having inner surfaces for selectively engaging the tapered surfaces on the shaft and outer surfaces for selectively engaging the side wall of the socket means, and pressure-applying means engaging the socket means and connected to the connecting portion of the shaft for applying pressure to cause the inner and outer surfaces of the segments to respectively forcibly engage the tapered surfaces of the shaft and the side wall of the socket means in a manner whereby the arm can be locked to the shaft for movement therewith.

14. In combination: a drive shaft having a tapered portion and a connecting portion adjacent said tapered portion, an arm provided with housing means having an end wall with an aperture therein and also having side wall structure, abutment means carried by the housing means and axially spaced in opposed relation to the end wall of the housing means, a plurality of inflexible elements movably arranged in the housing means and held therein by said abutment means, each of said elements having an inner surface for engaging the tapered portion on the shaft and also having an outer surface for engaging the side wall structure of the housing means, and movable pressure-applying means trapped in the aperture provided in the end wall and engaging the connecting portion of the shaft for applying pressure to cause the inner and outer surfaces of the elements to respectively forcibly engage the tapered portion of the shaft and the side wall structure of the housing means in a manner whereby the arm can be locked to the shaft for movement therewith.

15. In combination: a drive shaft having a portion provided with tapered surfaces and a threaded portion adjacent the tapered surfaces, a windshield wiper arm provided with an inner section having housing means, said housing means having an end wall provided with an aperture into which the threaded portion of the shaft extends and also having side wall structure, abutment means carried by the housing means and axially spaced from the end wall of the housing means, a plurality of rigid elements movably arranged in the housing means and held therein by said abutment means, each of said elements having an inner surface for engaging a tapered surface on the shaft and an outer surface for engaging the side wall structure of the housing means, and a nut engaging the housing means and connected to the threaded portion of the shaft for applying pressure to cause the inner and outer surfaces of the elements to respectively forcibly engage tapered surfaces of the shaft and the side wall structure of the housing means in a manner whereby the wiper arm can be locked to the shaft for movement therewith.

16. An assembly comprising a rotatable drive shaft having a tapered portion and a connecting portion adjacent the tapered portion, an arm provided with housing means having an end wall with an aperture therein through which the connecting portion extends and also having substantially annular side wall structure, a plurality of elements rotatable in the housing means, means for maintaining said elements in a predetermined assembled relationship, each of said elements having tapered longitudinally extending inner abutment means for engagement with the tapered portion of the shaft for keying the elements thereto and also having an outer arcuate surface for engaging the side wall structure, and manually operable means engaging the end wall of the housing means and the connecting portion of the shaft, the arrangement being such that when the manually operable means is loosened the arm can be rotated about the elements while the latter are engaged with the shaft and when tightened the abutment means and outer surfaces of the elements are caused to respectively forcibly engage the tapered portion of the shaft and the side wall structure to lock the arm to the shaft for movement therewith.

17. A subassembly comprising a support provided with an aperture for receiving a shaft, a cup having a base wall provided with a shaft-receiving aperture aligned with the aperture in the support and a cylindrical wall having marginal edges welded to the support to define a housing, and means trapped in the housing for engaging the shaft and the cylindrical wall for locking the subassembly to the shaft when the latter is forced through the said apertures.

18. A subassembly comprising a support provided with an aperture for receiving a shaft, a cup having a base wall at one end provided with a shaft-receiving aperture aligned with the aperture in the support and also having a cylindrical wall terminating at its other end in a marginal edge, means connecting at least a portion of said marginal edge of the cylindrical wall to the support to define a housing with the base wall and support spaced apart a distance sufficient to receive a plurality of radially expansible clutch shoes and means comprising a plurality of radially expansible clutch shoes trapped in the housing for engaging the shaft and the cylindrical wall for locking the subassembly to the shaft when the latter is inserted through the said apertures.

19. A windshield wiper arm mounting construction comprising a wiper arm having a mounting head, said mounting head including means defining a clutch chamber having a smooth generally cylindrical inner peripheral wall and an end wall having an opening therethrough, a clamping member including a portion located exteriorly of said end wall and said portion being of a size exceeding the size of said opening, a drive shaft having a portion adapted to fit within said clutch chamber, means adapted to threadably fasten said clamping member to said drive shaft, a plurality of wedge members in said clutch chamber surrounding said drive shaft, means included in the structure constituting said end wall and clamping member operable to engage first portions of said wedge members, shoulder means on said shaft tapered toward said clamping means and adapted to engage second portions of said wedge members adjacent the inner extremities thereof, whereby the threading of said clamping member on said drive shaft causes the relative axial movement between said clamping member and said drive shaft to be converted into a substantially radially directed movement of said wedge members outwardly into clutching engagement with said cylindrical peripheral inner wall and said clamping member preventing separation of said mounting head from said drive shaft while said clamping member and drive shaft remain threadably fastened.

20. A clutch mechanism for a windshield wiper arm for use on a shaft having a serrated section in the form of a truncated cone, said clutch mechanism comprising a cage forming a clutch chamber, said cage being fixed to said arm and having a smooth generally cylindrical wall and an end abutment, said shaft and said cage being coaxially disposed and mounted for relative rotation, a plurality of clutch shoes having outer faces arranged for frictional gripping engagement with the cylindrical wall of said cage, abutment means engageable with said end abutment, and inner faces arranged for gripping engagement with the serrated section of said shaft, and means connected with the shaft and with the end abutment for adjusting the shaft and the shoes relatively longitudinally of the shaft to force the outer faces of said shoes into gripping engagement with the cage to thereby lock the shaft and cage against relative rotation.

21. A clutch mechanism for a windshield wiper arm for use on a shaft having a serrated section in the form of a truncated cone, said clutch mechanism comprising a cup-shaped cage forming a clutch chamber, said cage being fixed to said arm and having a smooth generally cylindrical peripheral wall and an end abutment, said shaft and said cage being coaxially disposed and mounted for relative rotation, a plurality of clutch shoes having outer faces arranged for frictional gripping engagement with the cylindrical wall of said cage, abutment means engageable with said end abutment, and inner faces arranged for gripping engagement with the serrated section of said shaft, and screw-threaded means connected with the shaft and with the end abutment for adjusting the shaft and the shoes relatively longitudinally of the shaft to cause the serrated shaft section to force the outer faces of said shoes radially outwardly into gripping engagement with the cylindrical wall surface of the cage to thereby lock the shaft and cage against relative rotation.

22. A connector for connecting a shaft and an arm comprising a mounting head, a clamping member having an effective engaging relationship with a portion of said mounting head, a drive shaft having a portion adapted to fit within a chamber in said mounting head, means adapted to threadably fasten said clamping member to said drive shaft, a plurality of wedge members in said chamber surrounding said drive shaft, engaging means operable in conjunction with said clamping member for engaging first portions of said wedge members, and axially tapered shoulder means on said shaft engaging second portions of said wedge members spaced from said first portions, said wedge members being positioned between said engaging means and said shoulder means whereby the threading of said clamping member on said drive shaft causes the relative axial movement between said clamping member and said drive shaft to be converted into a substantially radially directed movement of said wedge members outwardly toward said engaging means, said engaging relationship between said clamping member and said mounting head preventing separation of said mounting head from said drive shaft while said clamping member and said drive shaft remain fastened.

23. The clutch mechanism as defined in claim 20 wherein the means for adjusting the shaft and shoes relatively comprises a nut rotatably journalled on said cage and threadably mounted on said shaft.

24. The clutch mechanism as defined in claim 23 wherein said nut is rotatably journalled within an opening in said cage formed therein concentric with said cylindrical wall.

25. The clutch mechanism as defined in claim 23 wherein said nut is rotatably journalled within an opening in said cage and wherein means is provided on said nut for limiting axial movement of said nut within said opening relative to said cage whereby to prevent the nut from becoming disengaged from said cage.

26. The clutch mechanism as defined in claim 21 wherein said cage additionally includes a transverse wall and the screw-threaded means comprises a nut rotatably journalled on said cage transverse wall and threadably mounted on said shaft.

27. The clutch mechanism as defined in claim 26 wherein said nut is rotatably journalled within an opening in the transverse wall of the cage formed therein concentric within said cylindrical wall.

28. The clutch mechanism as defined in claim 26 wherein said nut is rotatably journalled within an opening in the transverse wall of said cage and wherein means is provided on said nut for limiting axial movement of the nut within said opening relative to said cage whereby to prevent the nut from becoming disengaged from said cage.

29. A windshield wiper arm construction comprising an arm portion, a chamber with a wall in said arm portion, a drive shaft having an end and a portion proximate said end adapted to be positioned within said chamber, a clamping member adapted to be threadably fastened on said end of said drive shaft, a plurality of radially movable clutch members positioned in said chamber about said drive shaft, each of said clutch members having at least one inner surface tapering toward an outer surface, each of said outer surfaces being of a curvature for mating engagement with a portion of said chamber wall, first means on said drive shaft for engaging said inner surfaces of said clutch members, second means opposed to the first means and spaced therefrom in a direction toward said end of the shaft, said clutch members being positioned between said first and second means, said second means being associated with said clamping member and adapted to engage said clutch members for limiting their movement in an axial direction while said clamping member is tightened whereby relative axial movement between said clamping member and said drive shaft causes said first means in conjunction with said second means to convert said axial movement between said clamping member and said drive shaft into radial movement of said clutch members and thereby cause said clutch members to exert a substantially radially directed holding force against the wall of said chamber throughout the major portion of the outer surfaces of said clutch members.

30. A windshield wiper arm mounting construction comprising an arm portion, a chamber in said arm portion, a drive shaft having a portion adapted to be positioned within said chamber, a clamping member mounted on said arm portion, interlocking means for fastening said clamping member to said drive shaft to thereby tighten said arm portion on said drive shaft, a plurality of radially movable clutch members in said chamber positioned circumferentially about said drive shaft for providing a wedging action, means for limiting movement of said clutch members in the direction of the axis of said drive shaft, said clutch members having internal surfaces which are at an angle to the axis of said drive shaft, and shoulder means on said shaft spaced axially along said drive shaft from said means for limiting axial movement and responsive to movement of said clamping member on said shaft to engage said internal surfaces of said clutch members for causing relative axial movement between said clamping member and said drive shaft during a tightening operation to be converted to radial movement of said clutch members to thereby cause said clutch members to exert a substantially radially directed holding force relative to said arm portion.

References Cited

UNITED STATES PATENTS

| | | | |
|---|---|---|---|
| 2,515,303 | 7/1950 | Isnard | 287—53 |
| 596,558 | 1/1898 | Van Wagoner | 192—65 |
| 2,586,096 | 2/1952 | Schaal | 287—53 |
| 2,684,258 | 7/1954 | Krohm | 287—53 |
| 2,738,535 | 3/1956 | Horton | 287—53 |
| 565,542 | 8/1896 | Jameson | 287—53 |
| 1,240,230 | 9/1917 | Luce | 287—53 |

CARL W. TOMLIN, *Primary Examiner.*

A. V. KUNDRAT, *Assistant Examiner.*

U.S. Cl. X.R.

15—250.34